United States Patent [19]

Hunter et al.

[11] 3,854,936

[45] Dec. 17, 1974

[54] SMELTING OF NICKEL OXIDE ORES TO PRODUCE FERRONICKEL

[75] Inventors: Willard L. Hunter; Danton L. Paulson; William A. Stickney, all of Albany, Oreg.

[73] Assignee: The United States of America as represented by the Secretary of the Interior, Washington, D.C.

[22] Filed: Sept. 26, 1973

[21] Appl. No.: 401,004

[52] U.S. Cl............................ 75/82, 75/63, 75/69, 75/133
[51] Int. Cl............................................. C22b 23/00
[58] Field of Search.......... 75/82, 63, 89, 21, 1, 133

[56] References Cited
UNITED STATES PATENTS

| | | | |
|---|---|---|---|
| 2,663,631 | 12/1953 | Tschop et al. | 75/82 |
| 2,698,229 | 12/1954 | Lindsley et al. | 75/82 |
| 2,750,285 | 6/1956 | Perrin | 75/82 |
| 3,634,064 | 1/1972 | Vedensky et al. | 75/82 |
| 3,746,533 | 7/1973 | Moussoulos | 75/82 |

*Primary Examiner*—Walter R. Satterfield
*Attorney, Agent, or Firm*—Roland H. Shubert; Frank A. Lukasik

[57] ABSTRACT

Ferronickel is produced from nickel oxide ores, such as those of the laterite or serpentine types, in a cyclic smelting process using a carbon reductant. In the first stage of the cycle, carbon reductant is added to the furnace charge in sufficient amount to form a nickel-depleted slag and a low grade, ferronickel fraction. The slag is tapped, leaving ferronickel in the furnace, and a second ore charge containing a lesser amount of carbon is then smelted to form a nickel-rich slag and high grade ferronickel. This high grade ferronickel product fraction is then tapped, leaving nickel-rich slag in the furnace and the cycle is then repeated.

4 Claims, 1 Drawing Figure

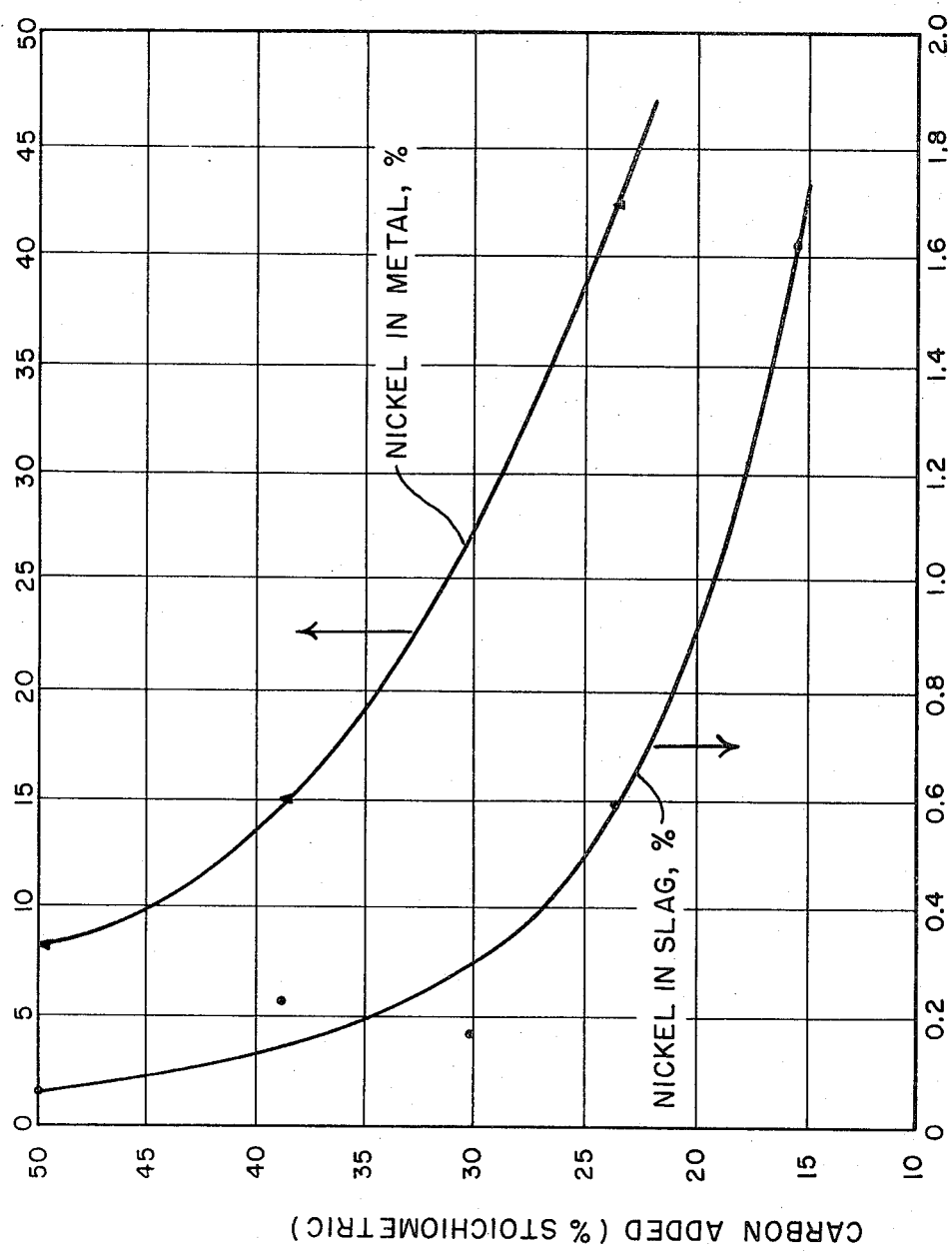

SMELTING OF NICKEL OXIDE ORES TO PRODUCE FERRONICKEL

CROSS REFERENCE TO RELATED APPLICATION

This patent application is related to patent application Ser. No. 401,002, filed of even date herewith, which is directed to a process for "Smelting of Copper Oxides to Produce Blister Copper" by Willard L. Hunter and William A. Stickney. The two patent applications are commonly assigned.

BACKGROUND OF THE INVENTION

Large quantities of nickel-bearing serpentine and laterite ores are found in the United States and in other areas of the world. These ores typically contain from about 1 to 2.5 percent nickel and occasionally contain smaller but significant amounts of cobalt and chromium. Nickel is seldom found as a mineral of definite composition and benefication techniques are generally inapplicable. Hence, the unbeneficiated ore must be subjected to a metal-lurgical treatment to extract the nickel.

Three major metallurgical approaches have been used in the past to extract nickel from these ores. Probably the oldest technique is that of matte smelting in which the ore is first sintered and then smelted with gypsum in a blast furnace to form an iron-nickel matte. This matte is then treated in a converter to remove iron. Remaining nickel matte is then calcined and reduced with carbon to form nickel metal.

A second process employs electro-metallurgical techniques to produce a ferronickel containing on the order of 20 to 25 percent nickel. Ore is smelted in an electric furnace with carbon to reduce the nickel and a portion of the iron contained in the ore to the metallic state. Temperatures employed are sufficiently high to insure slag fluidity with the use of little or no added fluxing agents. Carbon is employed in excess, based upon nickel content, in order to insure a high degree of nickel reduction and its recovery from the slag. A principal disadvantage of this process is the low grade of ferro-nickel recovered as a product.

A third technique, known as the Ugine process, employs a ferro-silicon reductant. Ore is melted in an electric furnace without reductant and the molten ore is then transferred to a ladle. Ferrosilicon reductant is added with agitation, accomplished by pouring the molten mixture from one ladle to another to produce a ferronickel product having a nickel content of about 45 percent. Since the iron content of the ferrosilicon reductant goes directly to ferronickel, this tends to dilute the ferronickel and places a definite limit on the grade of nickel which can be recovered from the process. While the Ugine process does produce a much higher grade of ferronickel than does electric furnace smelting using a carbon reductant, this advantage is somewhat offset by the requirement for use in the much more expensive ferrosilicon reducing agent.

SUMMARY OF THE INVENTION

Smelting of nickel oxide ores may be accomplished in a two-stage, cyclic process using a carbon reductant to produce a high grade ferronickel product and a nickel-depleted slag. The first stage of the cycle is accomplished under carbon-rich conditions to yield a nickel-poor slag while the second stage is accomplished under carbon-poor conditions to yield a high grade ferronickel product.

Hence, it is an object of our invention to produce high grade ferronickel from oxide ores of low nickel content.

Another object of our invention is to produce ferronickel of high nickel content and a lean slag from nickel oxide ores by carbon reduction.

DETAILED DESCRIPTION OF THE INVENTION

The invention will be described with reference to the accompanying drawing in which the single FIGURE is a plot representing the relationship of the nickel content of the slag and the nickel content of the ferronickel metal product as a function of the amount of carbon in the furnace charge.

Nickel ores of the laterite and serpentine types present unusually difficult problems in extractive metallurgy. Nickel is usually disseminated throughout the ore in a mineralogically obscure fashion which precludes benefication by ordinary techniques. Hence, the as-mined ore is typically treated by smelting in electric furnaces. Most of these ores also contain substantial quantities of iron compounds which further complicates the smelting operation because much of the iron is reduced to the metallic state along with nickel. This results in a low grade ferronickel product. If selective reduction is attempted in order to increase the nickel concentration in the ferronickel product, then nickel losses to the slag become so large as to be economically intolerable.

We have found that nickel ores of the laterite or serpentine type may be smelted in a cyclic process to recover high grade ferronickel comparable to that produced by the Ugine process while at the same time producing a lean slag containing no more, and in some cases less, nickel than is discarded in the slags produced in the carbon reduction processes.

In the first stage of our process, a nickel ore is smelted with a sufficient amount of a carbon reductant to form a molten slag depleted in nickel and a molten metal fraction of relatively low nickel content. The nickel-lean slag is then tapped leaving molten metal in the furnace. A second charge, consisting of nickel ore with a lesser amount of carbon reductant, is then added to the furnace. Smelting of the second charge produces a molten slag rich in nickel and a molten metal fraction consisting of a high grade ferronickel. The ferronickel product fraction is then tapped from the furnace leaving the nickel-rich slag in the furnace. The cycle is then repeated.

Ores of the serpentine and laterite types can be considered as a mixture of hydrated oxides including iron oxides, magnesium oxide, silica and alumina as well as nickel oxide. Nickel oxide is more readily reducible to the metal than are iron oxides but equilibrium considerations require reduction of a substantial amount of iron to the metallic state in order to attain a high recovery of nickel from the slag. Hence, a sufficient amount of carbon reductant, based on conversion of nickel oxide (NiO) and iron oxide ($Fe_2O_3$) to metal with carbon going to the monoxide, is required to produce a nickel-depleted slag. Alternately when smelting the second charge under more carbon deficient conditions, iron is preferentially oxidized by the ore charge with the result that the metallic fraction is enriched in nickel. However, only a part of the nickel contained in the second charge is reduced thus leaving a nickel-rich slag.

Amount of carbon used to smelt the first charge with respect to that stoichiometrically required to reduce the nickel oxide (NiO) and iron oxide ($Fe_2O_3$) to metal depends upon the acceptable level of nickel residue in the discarded slag. Generally, we prefer to use at least 35 percent of the stoichiometric carbon requirement for smelting the first charge. The level of carbon deficiency when smelting the second charge is determined by the nickel content desired in the ferronickel product. Nickel concentrations of 40 to 45 percent in the ferronickel product are commercially desirable and such concentrations can be obtained by restricting the carbon reductant to about 25 percent or less of stoichiometric requirements when smelting the second charge. In a most preferred embodiment, we prefer to use at least 40 percent of the stoichiometric carbon requirement for smelting the first charge and less than 20 percent of the stoichiometric carbon requirement for smelting the second charge.

The plotted data presented in the FIGURE illustrates the relationship between the nickel content of the slag and the nickel content of the ferronickel metal product as a function of the carbon added to the furnace charge. As can readily be appreciated from the plot, it is impossible to obtain both a high grade ferronickel product and a nickel-lean slag in a process employing a single reduction step as is conventional.

Ore in the as-mined stage contains both free and combined water. It is necessary to thoroughly dry the ore in order to drive off all free moisture and it is highly desirable to calcine the ore at a sufficiently high temperature to remove most of the combined water prior to smelting. Presence of either free or combined moisture causes boiling of the charge in the smelting furnace as well as reducing efficiency of the process. Calcination temperatures of 1,200° to 1,500°F are appropriate for most ores and calcination may be accomplished in conventional rotary kilns. It is preferred that hot calcine be used as the furnace charge in order to speed the smelting cycle and to reduce the heat requirements of the smelting step. Electric furnaces, particularly carbon electrode, arc furnaces are preferred to carry out the smelting step.

Compared to the Ugine process, our cyclic smelting technique produces a high grade ferronickel product and a nickel-depleted slag while achieving shorter material retention times and improved power utilization. It requires a lower capital investment and uses carbon reductants such as coke instead of the much more expensive ferrosilicon. The following example will serve to illustrate a specific embodiment of our process.

EXAMPLE

A sample of a lateritic nickel ore containing about 1.45 percent nickel in the oxide form was dried and calcined. A first ore charge was mixed with sufficient coke to provide about 35 percent of the carbon stoichiometrically required to reduce the nickel oxide (NiO) and iron oxide ($Fe_2O_3$) to metal. This first charge was smelted in an electric furnace and a nickel-depleted liquid slag was then tapped from the furnace leaving a low grade ferronickel within the furnace. Slag tapped from the furnace had a nickel content of 0.2 percent.

A second charge consisting of calcined nickel ore mixed with about 24 percent of the coke stoichiometrically required to reduce nickel oxide (NiO) and iron oxide ($Fe_2O_3$) to metal was added to the furnace and smelted. After smelting was complete, a ferronickel product was tapped from the furnace leaving a nickel-rich slag within the furnace. The tapped ferronickel analyzed 44 percent nickel.

We claim:

1. A process for producing ferronickel from nickel oxide ores which comprises:
   heating in a furnace a first charge comprising nickel oxide ore with a carbon reductant in an amount sufficient to provide at least 35 percent of the carbon stoichiometrically required to reduce the nickel oxide (NiO) and iron oxide ($Fe_2O_3$) contained in the ore charge to metal to form a liquid slag depleted in nickel and a liquid ferronickel phase rich in iron;
   tapping from the furnace a substantial portion of the nickel-depleted slag;
   adding to the furnace, still containing the liquid ferronickel phase, a second charge comprising nickel oxide ore and a carbon reductant in an amount less than 25 percent of the carbon stoichiometrically required to reduce the nickel oxide (NiO) and iron oxide ($Fe_2O_3$) contained in the second ore charge to metal;
   heating the second charge to form a liquid slag rich in nickel and a nickel-rich, ferronickel phase, and
   tapping from the furnace a substantial portion of the nickel-rich, ferronickel phase.

2. The process of claim 1 wherein the nickel ore is chosen from the group consisting of laterites and serpentines and wherein said ore is calcined at a temperature sufficiently high to remove most of the chemically combined water contained in the ore prior to smelting.

3. The process of claim 2 wherein the carbon reductant is coke.

4. The process of claim 3 wherein the first charge contains at least 40 percent of the carbon stoichiometrically required to reduce the nickel oxide (NiO) and iron oxide ($Fe_2O_3$) contained in the ore charge to metal and wherein the second charge contains less than 20 percent of the carbon stoichiometrically required to reduce the nickel oxide (NiO) and iron oxide ($Fe_2O_3$) contained in the second charge to metal.

* * * * *